(12) United States Patent
Muck et al.

(10) Patent No.: US 7,751,307 B2
(45) Date of Patent: Jul. 6, 2010

(54) COMMUNICATION APPARATUS AND A METHOD OF TRANSMITTING DATA THEREFOR

(75) Inventors: Makus Muck, Pris (FR); Marc Bernard De Courville, Paris (FR); Stephanie Rouquette-Leveil, Massy (FR)

(73) Assignee: Motorola, Inc., Schaumburg, IL (US)

( * ) Notice: Subject to any disclaimer, the term of this patent is extended or adjusted under 35 U.S.C. 154(b) by 290 days.

(21) Appl. No.: 11/721,574

(22) PCT Filed: Nov. 18, 2005

(86) PCT No.: PCT/US2005/041972

§ 371 (c)(1),
(2), (4) Date: Jun. 13, 2007

(87) PCT Pub. No.: WO2006/076080

PCT Pub. Date: Jul. 20, 2006

(65) Prior Publication Data

US 2008/0101487 A1 May 1, 2008

(30) Foreign Application Priority Data

Jan. 11, 2005 (EP) .................................. 05290064

(51) Int. Cl.
*H04J 11/00* (2006.01)
*G01R 31/08* (2006.01)
*H04J 1/00* (2006.01)
*H04J 3/16* (2006.01)
*H04B 7/02* (2006.01)

(52) U.S. Cl. ........................ 370/208; 370/252; 370/343; 370/465; 375/267

(58) Field of Classification Search ................. 370/252, 370/203, 206, 208, 343, 344, 465; 375/260, 375/295

See application file for complete search history.

(56) References Cited

U.S. PATENT DOCUMENTS 5,381,449 A 1/1995 Jasper et al.

(Continued)

FOREIGN PATENT DOCUMENTS

WO WO2004043028 A1 5/2004

OTHER PUBLICATIONS

Fernandez-Getino, et al., "Joint Channel Estimation and Peak-to-Average Power Reduction in Coherent OFDM: A Novel Approach," VTC 2001 Spring, IEEE 53rd Vehiclular Technology Conference, Rhodes, Greece, May 6-9, 2001, IEEE Vehiclular Technology Conference, New York, NY, IEEE, US vol. 2 of 4, May 6, 2001, pp. 815-819.

(Continued)

*Primary Examiner*—Nittaya Juntima (57) ABSTRACT

An Orthogonal Frequency Division Multiplex (OFDM) transmitter (100) comprises a symbol generator (103) for generating a first OFDM symbol comprising user data and pilot data where the pilot data comprises a set of predetermined non-orthogonal pilot symbols. A weight generator (109) uses an amplitude estimator (107) for selecting a set of weights for the pilot data of the first OFDM symbol in response to a time domain amplitude variation characteristic of the first OFDM symbol. In particular, the peak to average power ratio may be determined. The set of weights are selected from a discrete alphabet of weights. A weight processor (113) determines a second OFDM symbol by weighting the pilot symbols by the set of weights. The second OFDM symbol is transmitted to a receiver without transmitting identification of the selected set of weights. The receiver may perform a blind detection of the applied weights and may compensate the received pilot symbols for the estimated weight.

3 Claims, 4 Drawing Sheets

U.S. PATENT DOCUMENTS

| | | | | |
|---|---|---|---|---|
| 7,463,697 | B2* | 12/2008 | Maltsev et al. | 375/297 |
| 2004/0100897 | A1* | 5/2004 | Shattil | 370/206 |
| 2005/0259565 | A1 | 11/2005 | Fujii et al. | |
| 2005/0265226 | A1 | 12/2005 | Shen et al. | |
| 2006/0028976 | A1 | 2/2006 | Park et al. | |

OTHER PUBLICATIONS

Fernandez-Getino, et al., "Orthogonal Pilot Sequences for Peak-to-Average Power Reduction in OFDM," VTC 2001 Fall, IEEE 54th Vehiclular Technology Conference, Atlantic City, NJ, Oct. 7-11, 2001, IEEE Vehiclular Technology Conference, New York, NY, IEEE, US vol. 2 of 4, Oct. 7, 2001, pp. 650-654.

Agudo Cortada, E., "European Search Report," European Patent Office, Munich, Germany, Jul. 20, 2005.

Huy Vu, "PCT International Search Report and Written Opinion," WIPO, ISA/US, Commissioner for Patents, Alexandria, VA, USA, Aug. 24, 2006.

Agudo Cortada, E., "European Office Action," European Patent Office, Munich, Germany, Feb. 14, 2007.

Ellen Moyse, "PCT International Preliminary Report on Patentability," The International Bureau of WIPO, Geneva, Switzerland, Jul. 26, 2007.

Newlogic Technologies AG, "Wide Range 10 GHz Frequency Synthesizer with Optional f/2 or f/4 Outputs," NewLogic Technologies AG, Lustenau, Autria, Version 1.0, Jul. 2004, 17 pages.

* cited by examiner

COMMUNICATION APPARATUS AND A METHOD OF TRANSMITTING DATA THEREFOR

FIELD OF THE INVENTION

The invention relates to a communication apparatus and a method of transmitting data therefor and in particular to transmission of data in Orthogonal Frequency Division Multiplex (OFDM) systems.

BACKGROUND OF THE INVENTION

In recent years, wireless data communication in domestic and enterprise environments have become increasingly commonplace and an increasing number of wireless communication systems have been designed and deployed. In particular, the use of wireless networking has become prevalent and wireless network standards such as IEEE 801.11a (Trademark) and IEEE 801.11g (Trademark) have become commonplace.

The requirement for increasing data rates, communication capacity and quality of service has led to continued research and new techniques and standards being developed for wireless networking. As a specific example, the Institute of Electrical and Electronic Engineers (IEEE) have formed a committee for standardising a high-speed WLAN standard known as IEEE 802.11n (TradeMark). The 802.11n™ standard comprises Wireless LAN Medium Access Control (MAC) and Physical Layer (PHY) Specifications aimed at enhancing WLANs to provide higher effective data throughputs. IEEE 802.11n™ is expected to operate in the 5 GHz frequency spectrum and promises data rates of around 100 Mbps and above on top of the MAC layer. 802.11n™ will use many techniques which are similar to the earlier developed IEEE 801.11a™ and IEEE 801.11g™ standards. The standard is to a large extent compatible with many of the characteristics of the earlier standards thereby allowing reuse of techniques and circuitry developed for these. For example, as in the previous standards IEEE 801.11a™ and IEEE 801.11g™, 802.11n™ will use Orthogonal Frequency Division Multiplex (OFDM) modulation for transmission over the air interface.

In order to acquire e.g. synchronisation data for a signal, it is known to transmit known data. The receiver may determine characteristics of the received signal and the propagation channel by evaluating the distortions introduced to the known data by the transmission.

Specifically, in IEEE 801.11a™ and IEEE 801.11g™ a number of sub-carriers of each OFDM symbol is allocated for transmission of known pilot symbols and each OFDM symbol thus comprises a pilot tone comprising four pilot symbols. In IEEE 801.11a™ and IEEE 801.11g™, the pilot tone comprises the pilot symbols [1 −1 1 1] or [−1 1 −1 −1] in subcarriers #−21, #−7, #7 and #21 respectively following the definitions in the IEEE802.11a standard.

In the current 802.11n™ proposals there are several pilot sets proposed: 2 or 4 pilot tones for 20 MHz bandwidth modes, 4 or 6 or 8 pilot tones for 40 MHz bandwidth modes.

A disadvantage associated with OFDM is that the transmitted signal has very large amplitude variations in the time domain. In particular the Peak to Average Power Ratio (PAPR) is typically large and this large dynamic range requires that the power amplifier has a large linear dynamic range as any non-linearity will result in a degraded performance. In more detail, the OFDM time domain samples typically follow a Rayleigh distribution approximately and can attain very high peak amplitude.

In order to deal with these high peak amplitudes the power amplifier is typically substantially backed-off from the non-linear operating region. However, this results in a reduced dynamic range for a given supply voltage and results in increased complexity, cost and power consumption for the power amplifier.

In order to reduce this disadvantage, a number of techniques have been developed to reduce PAPR for OFDM signals. Such techniques include using some subcarriers for selection of dummy data symbols that result in a reduced PAPR, increasing the symbol constellation points and selection between these to reduce PAPR, and addition of a time-domain sequence chosen from a predefined set and communication of the chosen sequence to the receiver. However, most of these techniques are unsuitable for communication systems such as IEEE 802.11 systems because they would require substantial system modifications, additional signalling and/or be contrary to the technical standards. For example, most of these techniques would be incompatible with the defined standards, algorithms and techniques already developed for IEEE 802.11 systems.

An example of a PAPR reduction scheme is presented in "Joint channel estimation and peak-to-average power reduction in coherent OFDM: a novel approach" by Fernandez-Getino Garcia, M. J.; Edfors, O.; Paez-Borrallo, J. M.; Vehicular Technology Conference, 2001. VTC 2001 Spring. IEEE VTS 53rd, Volume: 2, 6-9 May 2001, Pages: 815-819 vol. 2. The described technique comprises selecting pilot symbols of an OFDM signal such that the time domain PAPR is reduced. Furthermore, specific OFDM sub carriers are reserved for transmitting information to the receiver of which pilot signals have been selected.

However, such an approach is incompatible with many communication systems where the use of a specific set of pilot symbols is prescribed e.g. by the standards for the communication system. In particular, the described approach is incompatible with IEEE 802.11 communication systems. Furthermore, the increased signalling of information reduces the effective throughput and efficiency of the communication network.

"Orthogonal pilot sequences for peak-to-average power reduction in OFDM" by Fernandez-Getino Garcia, M. J.; Paez-Borrallo, J. M.; Edfors, O.; Vehicular Technology Conference, 2001. VTC 2001 Fall. IEEE VTS 54th, Volume: 2, 7-11 Oct. 2001, Pages: 650-654 vol. 2 discloses a similar approach relying on the use of orthogonal pilot sequences to enable a receiver to determine the selected pilot symbols by blind detection thereby obviating the necessity of transmitting information of the selected pilot symbols. However, the described approach is incompatible with many communication systems, such as IEEE 802.11 communication systems, which do not allow a free selection of pilot symbols or the use of orthogonal pilot sequences.

Hence, an improved system would be advantageous and in particular a system allowing increased flexibility, improved performance, increased throughput, reduced signalling; suitability for a large range of pilot sequences and/or improved compatibility with existing systems and techniques and in particular with IEEE802.11 communication systems would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a communication apparatus for a communication system, the communication apparatus having an OFDM transmitter for transmitting OFDM symbols comprising: means for generating a first OFDM symbol comprising user data and pilot data; the pilot data comprising a set of predetermined non-orthogonal pilot symbols;

means for selecting a set of weights for the pilot data of the first OFDM symbol in response to a time domain amplitude variation characteristic of the first OFDM symbol, the set of weights being selected from a discrete alphabet of weights; means for generating a second OFDM symbol by weighting the pilot symbols by the set of weights; and means for transmitting the second OFDM symbol to a receiver without transmitting identification of the selected set of weights.

The invention may provide improved performance for OFDM communications and may in particular allow a reduced dynamic range of the OFDM symbols. An additional degree of freedom may be introduced by weighting predetermined non-orthogonal pilot symbols thereby allowing improved performance while e.g. retaining compatibility with requirements for use of specific pilot data. The invention may for example allow a reduced distortion and/or out of band interference. For example, small non-linearities may not result in significant distortion of the transmitted signal but may result in increases spectral components outside the channel bandwidth which typically may result in the transmitter failing to meet the interference requirements. This may be obviated or mitigated in some embodiments of the current invention.

Furthermore, the improved performance may be achieved without requiring an increased overhead and reduced throughput associated with communication of the selected weights to the receiver. Specifically, use of a discrete alphabet of weights combined with predetermined pilot symbols may allow a low complexity and accurate determination of the selected weights by the receiver using channel estimates.

The invention may specifically allow a reduced Peak to Average Power Ratio (PAPR) thereby relaxing design criteria for a power amplifier of the OFDM transmitter resulting in reduced cost and/or complexity and/or increased reliability. Furthermore, the efficiency of the power amplifier may be improved leading to a significantly reduced power consumption of the OFDM transmitter and/or keeping the out-of-band radiation limited.

The invention may allow compatibility with existing standards and/or may allow use of a large number of existing techniques and/or algorithms thereby allowing increased reuse of existing equipment.

The set of weights may comprise different weights for different pilot symbols of the OFDM symbol. A number of OFDM carriers of the OFDM symbol may be reserved for pilot data and a single pilot symbol may be transmitted in each of the sub-carriers. In some embodiments, the same pilot symbol is transmitted in a plurality and possibly all sub-carriers reserved for pilot data.

According to an optional feature of the invention, the pilot data comprises symbols from a discrete symbol alphabet. This may improve performance and/or facilitate implementation. The communication apparatus may specifically allow improved PAPR performance for pilot symbols required to be selected from a limited discrete alphabet of data symbol values According to an optional feature of the invention, the discrete symbol alphabet comprises a different number of symbols than a number of weights in the discrete alphabet of weights. In particular, the number of symbols in the discrete symbol alphabet may be lower than the number of weights in the discrete alphabet of weights. The feature may e.g. provide additional freedom as the set granularity for the pilot symbols and weights may be individually optimised.

According to an optional feature of the invention, the set of weights comprises a weight common to a plurality of pilot symbols of the OFDM symbol.

The set of weights may comprise a single weight which is applied to all pilot symbols of the OFDM symbol. This may provide improved performance and/or may reduce complexity. In particular, a blind determination of the selected weights by the receiver may be improved and/or facilitated.

According to an optional feature of the invention, the set of predetermined non-orthogonal pilot symbols comprises a set of predetermined pilot symbols for an OFDM symbol as defined in the Technical Specifications for IEEE802.11a™. In particular, the set of predetermined non-orthogonal pilot symbols may the predetermined pilot symbols defined in IEEE 802.11a, Part 11: Wireless LAN Medium Access Control (MAC) and Physical Layer specifications (PHY)—High Speed Physical Layer in the 5 GHz band, IEEE Std 802.11a-1999, IEEE Standards Department, New York, January 1999.

The communication apparatus may in particular allow improved performance while retaining compatibility with pilot symbols specified for IEEE802.11a™. Thus, improved performance, and in particular reduced time domain amplitude variations, may be achieved in systems utilising pilot symbols as specified in IEEE802.11a™. Such systems may specifically include other IEEE802.11™ systems such as IEEE802.11g™ or IEEE802.11n™.

According to an optional feature of the invention, the set of predetermined non-orthogonal pilot symbols comprises a phase rotated set of complex symbols comprising [1 −1 1 1].

A phase rotation may correspond to a multiplication by a complex number with unity amplitude. The phase rotation may e.g. be a zero phase rotation (no operation) or may correspond to a sign inversion of all symbols of the set.

The communication apparatus may in particular allow improved performance in communication systems using non-orthogonal pilot symbols which comprise a phase rotated set of complex symbols comprising [1 −1 1 1].

According to an optional feature of the invention, the discrete alphabet comprises two weight values. The set may specifically comprise symbols of a 2-PSK alphabet. Using two weight values may provide particularly advantageous performance in many embodiments as it may provide a particular advantageous trade of between complexity, reliability of blind weight determination at the receiver and amplitude variation reduction.

According to an optional feature of the invention, the discrete alphabet comprises four weight values. The set may specifically comprise symbols of a 4-PSK alphabet. Using four weight values may provide particularly advantageous performance in many embodiments as it may provide a particular advantageous trade of between complexity, reliability of blind weight determination at the receiver and amplitude variation reduction.

According to an optional feature of the invention, the discrete alphabet comprises three weight values. Using three weight values may provide particularly advantageous performance in many embodiments as it may provide a particular advantageous trade of between reliability of blind weight determination at the receiver and amplitude variation reduction.

According to an optional feature of the invention, the second OFDM symbol comprises only four pilot symbols. This may allow improved performance and in particular the communication apparatus may improve performance for OFDM systems using only four pilot symbols, such as IEEE 802.11™ systems.

According to an optional feature of the invention, the receiver comprises means for compensating pilot data of a received OFDM symbol for a set of pilot weights; means for determining a receive characteristic in response to the compensated pilot data; and means for receiving OFDM symbols in response to the receive characteristic. The receiver may specifically comprise means for determining a channel estimate for a communication channel between the transmitter and receiver; means for determining the set of weights for the second OFDM symbol in response to the channel estimate; and the means for compensating the pilot data may compensate the pilot data in response to the set of weights.

This may provide a suitable implementation of the communication apparatus and may specifically provide a receiver capable of extracting information from the modified pilot symbols. The receive characteristic may specifically be a synchronisation characteristic such as a carrier phase, carrier frequency and/or symbol timing parameter.

According to an optional feature of the invention, the transmitter is a Multiple In Multiple Out, MIMO, transmitter.

The communication apparatus may provide particularly advantageous performance when used in a MIMO system. A low complexity may be achieved as the amplitude variations of OFDM transmissions of different transmission paths typically are identical thus allowing the same weights to be used.

According to an optional feature of the invention, the means for transmitting is arranged to transmit the second OFDM symbol on a first antenna and the transmitter further comprises: means for generating a third OFDM symbol by phase rotation of the second OFDM symbol; and means for transmitting the third OFDM symbol to the receiver on a second antenna without transmitting identification of the selected set of weights. This may provide improved performance while allowing the same weights to be used to reduce amplitude variations as these are unaffected by a phase rotation.

According to an optional feature of the invention, the OFDM transmitter comprises means for Space Time Coding OFDM symbols transmitted on the first and second antennas. The communication apparatus may allow improved performance and low complexity while exploiting the advantages of Space Time Coding.

According to an optional feature of the invention, the OFDM transmitter comprises means for Spatial Division Multiplexing of the OFDM symbols transmitted on the first and second antennas. The communication apparatus may allow improved performance and low complexity while exploiting the advantages of Spatial Division Multiplexing.

According to an optional feature of the invention, the communication apparatus further comprises means for determining a time domain amplitude dynamic range indication of the first OFDM symbol and the means for selecting the set of weights is operable to select the weights only if the time domain amplitude dynamic range indication is indicative of a dynamic range above a threshold. This may reduce complexity and the computational burden of selecting weights.

According to another aspect of the invention, there is provided a wireless network comprising a communication apparatus as described above. The wireless network may specifically be an IEEE 802.11™ communication network such as an IEEE 802.11a™, IEEE 802.11g™ or IEEE 802.11n™ wireless network.

According to another aspect of the invention, there is provided a method of transmitting data in a communication system, the method comprising: generating a first OFDM symbol comprising user data and pilot data; the pilot data comprising a set of predetermined non-orthogonal pilot symbols; selecting a set of weights for the pilot data of the first OFDM symbol in response to a time domain amplitude variation characteristic for the first OFDM symbol, the set of weights being selected from a discrete alphabet of weights; generating a second OFDM symbol by weighting the pilot symbols by the set of weights; and transmitting the second OFDM symbol to a receiver without transmitting identification of the selected set of weights.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS OF THE INVENTION

The following description focuses on embodiments of the invention applicable to an IEEE 802.11™ wireless communication network and in particular to a communication network compatible with standardisation efforts of IEEE 802.11n™. In particular, the described examples focus on implementations using pilot symbols standardized for use in IEEE 802.11g™ and IEEE 802.11a™ as these are also expected to be standardized for IEEE 802.11n™. However, it will be appreciated that the invention is not limited to this application but may be applied to many other networks including for example IEEE 802.11g™ and IEEE 802.11a™ networks.

Figure 1:
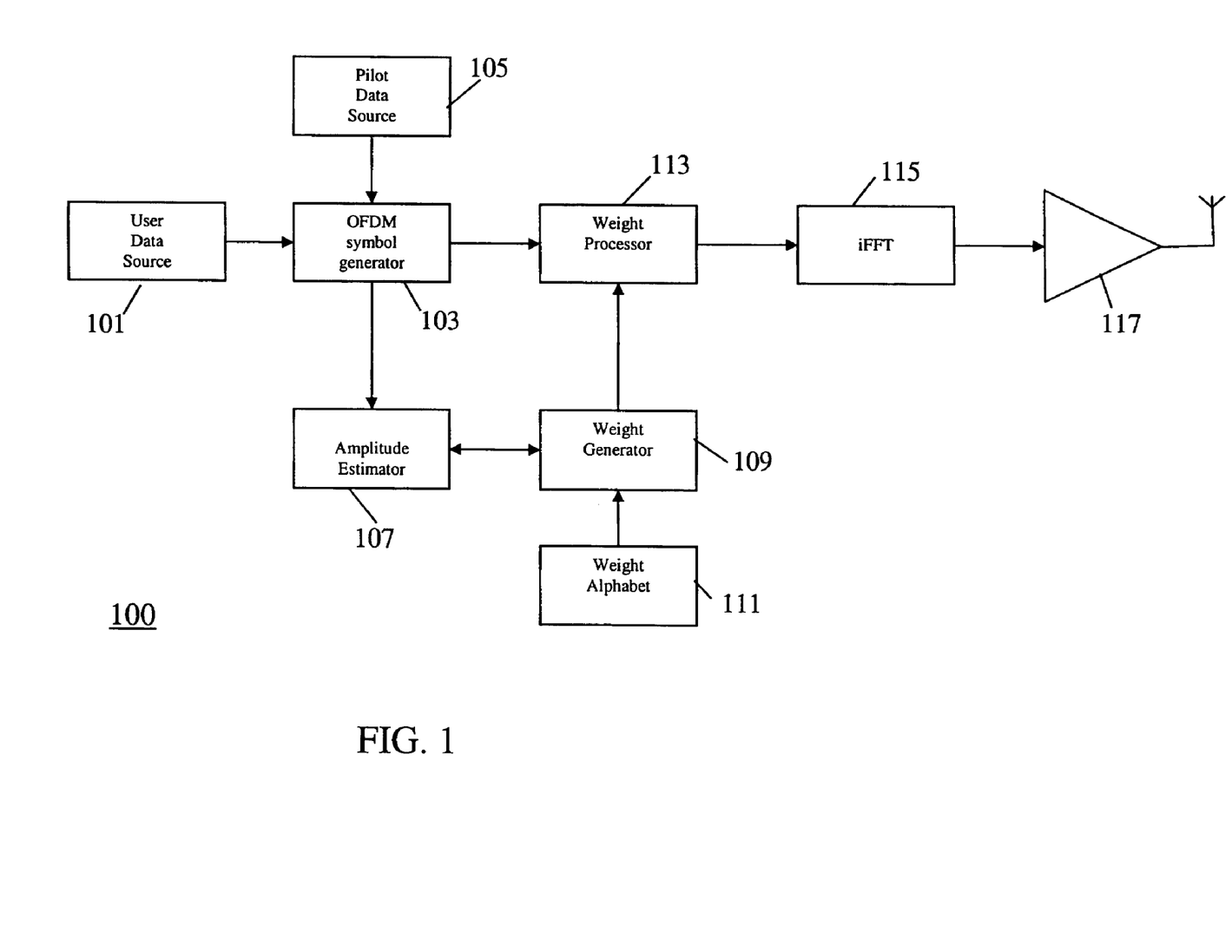
FIG. 1 illustrates an example of an OFDM transmitter 100 in accordance with some embodiments of the invention.

FIG. 1 illustrates an example of an OFDM transmitter 100 in accordance with some embodiments of the invention.

The OFDM transmitter 100 comprises a user data source 101 which generates user data or receives this from an external source. The user data source 101 is coupled to an OFDM symbol generator 103 which generates a first OFDM symbol. The OFDM symbol generator 103 is furthermore coupled to a pilot data source 105 which provides pilot data for inclusion in the transmitted OFDM word.

In most OFDM communication systems, OFDM symbols may include known pilot data that can be used by a receiver to determine communication channel characteristics and in particular the receiver may estimate e.g. carrier phase offsets, carrier frequency offsets and timing offsets using the pilot symbols.

In many systems, such as IEEE 802.11™ systems, specific subcarriers are reserved for transmission of pilot symbols. Specifically in IEEE 802.11™ systems a 64 subcarrier OFDM modulation scheme is used wherein subcarriers #−21, #−7, #7 and #21 are reserved for pilot symbols. Furthermore, IEEE 802.11™ systems prescribe that specific predetermined pilot symbols are used for these subcarriers and in particular it is specified that the pilot symbols are either given by the set of [1 −1 1 1] or [−1 1 −1 −1] (wherein each set indicates the four pilot symbols of subcarriers #−21, #−7, #7 and #21 respectively). The set for an individual OFDM symbol is selected depending on a sequence which is obtained by the scrambler which is also defined in the IEEE802.11a™ standard.

In the example of FIG. 1, the pilot data source 105 thus delivers either the set of [1 −1 1 1] or [−1 1 −1 −1] to the OFDM symbol generator 103. The OFDM symbol generator 103 then generates the OFDM symbol word by allocating the pilot symbols to the appropriate subcarriers and by allocating user data to the appropriate subcarriers.

It will be appreciated that other pilot tones may be equally applicable. For example, the current 802.11n proposals include several proposed pilot sets: 2 or 4 pilot tones for 20 MHz bandwidth modes and 4 or 6 or 8 pilot tones for 40 MHz bandwidth modes.

OFDM symbol generator 103 is coupled to an amplitude estimator 107 which is arranged to generate a time domain amplitude variation characteristic for the first OFDM symbol. In particular, the amplitude estimator 107 determines a Peak to Average Power Ratio (PAPR) estimate.

The amplitude estimator 107 is coupled to a weight generator 109 which selects a set of weights for the pilot data of the OFDM symbol in response to the time domain amplitude variation characteristic determined by the amplitude estimator 107.

In some embodiments, the weight generator 109 proceeds to determine the set of weights only if the time domain amplitude variation characteristic for the original OFDM symbol is above a given threshold. Thus, if the amplitude estimator 107 determines that the amplitude variation and specifically the PAPR is below a given threshold, the weight generator 109 does not generate different weights but allow the original symbol to be transmitted unamended.

The weight generator 109 is coupled to a weight alphabet store 111 which comprises a discrete alphabet of weights that may be selected. For example, the weight alphabet may in some embodiments comprise the values of [1, −1], in other embodiments the values of [1, −1, j, −j] and in yet other embodiments the weights of [1, −1, j, −j, (1+j)/√2, (−1+j)/√2, (1−j)/√2, (−1−j)/√2].

It will be appreciated that any suitable method or algorithm for determining the amplitude characteristic and/or for selecting the weights may be used.

As a specific example, the amplitude estimator 107 may initially determine the PAPR of the unmodified OFDM word (corresponding to a weight of 1 for each pilot symbol) by performing an iFFT of the OFDM symbol to obtain a time domain representation. The amplitude estimator 107 may then determine the peak amplitude sample value and the average amplitude sample value and determine the PAPR as the ratio between these.

The weight generator 109 may then select the next weight in the alphabet (for example, the weight −1 in the case of using the alphabet consisting in [1,−1] and apply this to the first pilot symbol of the OFDM word. The amplitude estimator 107 may then determine the PAPR for the modified OFDM word.

The weight generator 109 may then proceed to select the next weight in the alphabet and determine the resulting PAPR for this weight. When all weights of the alphabet have been evaluated for the first pilot symbol, the next weight for the second pilot symbol may be selected and the PAPR values for all possible weight values of the first pilot symbol may be generated.

This process may then be continued for the third pilot symbol and so on, until a PAPR value for all possible combinations of individual weights for the individual pilot symbols have been evaluated. The weight generator 109 may then proceed to select the weight combination which results in the lowest PAPR.

The weight generator 109 and the OFDM symbol generator 103 are coupled to a weight processor 113 which modifies the OFDM symbol for transmission by weighting the pilot symbols by the set of weights. In particular, the selected weight for each pilot symbol is applied to the appropriate pilot symbol by a complex multiplication operation. The weight processor 113 may then generate an OFDM symbol which has a significantly reduced time domain dynamic range.

In some embodiments, the weight processor 113 proceeds to modify the original OFDM symbol only if the time domain amplitude variation characteristic for the original OFDM symbol is above a given threshold. Thus, if the amplitude estimator 107 determines that the amplitude variation and specifically the PAPR is below a given threshold, the weight processor 113 does not apply weights to the original OFDM symbol.

The weight processor 113 is coupled to an inverse Discrete Fourier Transform (iDFT) processor 115 to which the weighted OFDM word is fed. The iDFT processor 115 proceeds to perform an inverse Discrete Fourier Transform to generate the corresponding time domain signal. The inverse Discrete Fourier Transform may specifically be an inverse Fast Fourier Transform. The time domain signal is fed to a linear power amplifier 117 for transmission to a receiver over an air interface.

Thus, the OFDM transmitter 100 may provide improved performance while permitting that predetermined non-orthogonal pilot symbols are used. The approach may introduce an additional degree of freedom that can be used to reduce the dynamic range of the time domain signal thereby facilitating design and reducing complexity of the linear power amplifier as well as reducing power consumption. Thus, for example reduced PAPR may be obtained for systems using IEEE 802.11™ predetermined pilot data thereby allowing for e.g. an increased reuse of algorithms, techniques, software, hardware and/or equipment for IEEE 802.11a™ or IEEE 802.11g™ systems to be used by an IEEE 802.11n™ system utilising the described approach.

It will be appreciated that for clarity and brevity, the description of the OFDM transmitter 100 has focussed on elements describing the specific exemplary application of the inventive concept but that the OFDM transmitter 100 will comprise further functionality required or desired for the operation of the transmitter. For example, the OFDM transmitter 100 may comprise functionality for performing Digital-to-Analog Conversion, modulation and frequency upconversion of the signal.

In the example of FIG. 1, the OFDM transmitter 100 may select weights by evaluating a PAPR for the OFDM word of the OFDM symbol generator 103 with all possible combinations of weights applied to the pilot symbols. The weights resulting in the lowest PAPR are selected and applied to the OFDM word before this is transmitted.

The predetermined set of non-orthogonal pilot symbols provided by the pilot data source is specifically non-orthogonal in the time domain. In particular, for a system wherein $P_n$ determines the pilot symbol values within OFDM symbol n, orthogonality requires that $\text{sum}(P_n(P_k)^*)=1$ for n=k and 0 otherwise. In the described embodiment, the pilot symbols are however in general not orthogonal and in particular, the same set of pilot symbols may be used in consecutive OFDM symbols and/or the same set of pilot symbols may potentially be phase rotated between consecutive OFDM symbols.

In particular, this means that the described techniques may be applied to communication systems which require that specific non-orthogonal pilot tones are used. For example, the approach may be used with existing communication systems specifying the use of specific non-orthogonal symbol sequences or with future communication systems which for various reasons (such as backwards compatibility) use non-orthogonal pilot sequences.

In particular IEEE 802.11a™ is specified to use either the pilot symbol set [1 −1 1 1] or the sign-inverted symbol set [−1 1 −1 −1] in given OFDM symbol. For each OFDM word, the symbol set is chosen between these in response to a pseudo noise generator which provides a pseudo random selection. This results in improved spectral properties. However consecutive OFDM words will either comprise the same pilot symbols or 180° phase rotated (sign inverted) pilot symbols and no reliance can therefore be made on the time domain orthogonality of such pilot symbols. Accordingly, known techniques such as that suggested in "Orthogonal pilot sequences for peak-to-average power reduction in OFDM" by Fernandez-Getino Garcia, M. J.; Paez-Borrallo, J. M.; Edfors, O.; Vehicular Technology Conference, 2001. VTC 2001 Fall. IEEE VTS 54th, Volume: 2, 7-11 Oct. 2001, Pages: 650-654 vol. 2 cannot be applied.

Furthermore, using the predetermined pilot symbols without consideration of the time domain amplitude variations results in stricter requirements of the linear power amplifier, an increased back-off and increased power consumption.

However, in the described example, the extra degree of freedom introduced by weighting the pilot symbols specified for IEEE 802.11™ systems are used to reduce the PAPR thereby reducing the back-off of the linear power amplifier and reducing power consumption.

Figure 2:
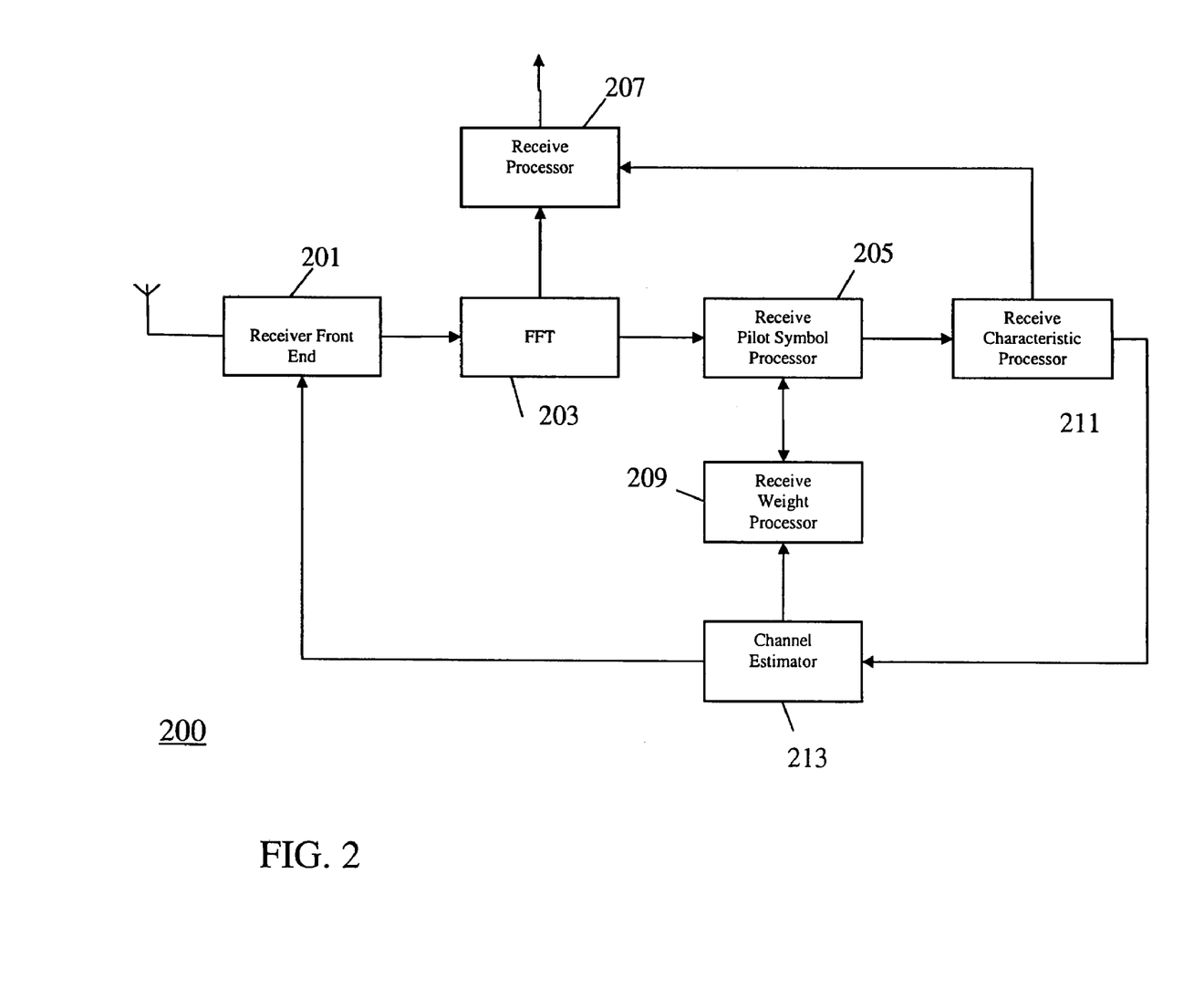
FIG. 2 illustrates an example of an OFDM receiver for receiving the OFDM signal transmitted by the OFDM transmitter of FIG. 1.

FIG. 2 illustrates an example of an OFDM receiver 200 for receiving the OFDM signal transmitted by the OFDM transmitter.

The OFDM receiver 200 comprises a receiver front end 201 which receives the signal transmitted from the OFDM transmitter 100 and performs filtering, amplification, down-conversion etc as is will be understood by the person skilled in the art.

The receiver front end 201 is coupled to a DFT processor 203 which performs a Discrete Fourier Transform which is the inverse of the inverse Discrete Fourier Transform performed in the OFDM transmitter 100. The Discrete Fourier Transform may specifically be a Fast Fourier Transform (FFT). The DFT processor 203 thus transforms the received time domain signal into a frequency domain OFDM symbol.

The DFT processor 203 is coupled to a receive pilot symbol processor 205 and a receive processor 207. The receive pilot symbol processor 205 is fed the pilot symbols from the reserved OFDM sub carriers and the receive processor 207 is fed the user data symbols.

The receive pilot symbol processor 205 is coupled to a receive weight processor 209 which determines the weights that have been applied to the pilot symbols and feed these to the receive pilot symbol processor 205. The receive pilot symbol processor 205 compensates the pilot data in response to the set of weights and may specifically perform the reverse operation of the weight processor 113.

For example, if the selected weight for a given pilot symbol is j, the weight processor 113 multiplies the pilot symbol by j.

If the receive weight processor 209 correctly estimates the applied weight as j, the receive pilot symbol processor 205 will multiply the received pilot symbol by −j. Thus, the effect of weighting the pilot symbol at the transmitter may be compensated by the receiver.

It will be appreciated that other approaches than the described example may be used. For example, it is possible to compensate for the phase rotation weights without explicitly estimating them. For example, if the discrete alphabet of weights comprises M-PSK symbols, the weight phase uncertainty may be removed by multiplying the phase of the pilot symbol by M.

The compensated pilot symbols are fed to a receive characteristic processor 211 which determines a receive characteristic in response to the compensated pilot symbols. For example, the receive characteristic processor 211 may determine a carrier phase offset as the difference between the phase of the received pilot symbols and the phase of the specified pilot symbols from the transmitter. The receive characteristic processor 211 may for example also determine other parameters such as a carrier frequency or timing offset.

The receive characteristic is fed to the receive processor 207 which may receive OFDM symbols in response to the receive characteristic. For example, the receive processor 207 may phase rotate the user data symbols to compensate for the determined carrier phase offset.

The receive characteristic processor 211 is also coupled to a channel estimator 213 which determines a channel estimate for the communication link between the OFDM transmitter 100 and the OFDM receiver 200. In a simple embodiment, the channel estimator 213 may simply comprise a phase averager or integrator which determines a low pass filtered carrier phase offset.

The channel estimator 213 is coupled to the receive weight processor 209 and the receiver front end 201 which may use the channel estimate to e.g. adjust the phase or frequency of the local oscillator.

The receive weight processor 209 may specifically determine the set of weights for the pilot symbols of the received OFDM symbol in response to the channel estimate.

For example, the local oscillator of the receiver front end 201 may be phase locked to the incoming signal and thereby any phase offset may be relatively small, say less than 5-10°. Furthermore, the receive weight processor 209 may know that only weights corresponding to 90° are included in the discrete weight alphabet. Accordingly, the receive weight processor 209 may determine the difference between the phase of the received pilot symbol and the phase of the known pilot symbol value. The weight may then be determined as the nearest 90° phase offset.

Accordingly, the use of a discrete alphabet of weights allows the receiver to perform a blind detection of the weights used by the transmitter thereby eliminating the necessity of communicating an identification of the selected weights.

It will be appreciated that the selection of a suitable discrete alphabet of weights may vary between different embodiments and that particular sets of weights may be particularly suited for specific discrete pilot symbol alphabet.

For example, IEEE 802.11™ systems use a discrete pilot symbol alphabet of [1,−1]. In order to increase the accuracy of a blind detection of the used weights, the discrete alphabet of weights is preferably kept sufficiently low that the phase difference between weights is substantially higher than the phase offset uncertainty. Furthermore, the discrete alphabet of weights may be selected to have a different number of weights than the number of symbols in the discrete symbol alphabet.

In many embodiments, a set of weights comprising 2, 4 or 8 weights are particularly advantageous. Specifically, these values may allow a low complexity implementation with multiplications reduced to a minimum. In particular, selecting a set of weights as e.g. [1,−1] or [1,−1,j,−j] allows multiplications to be replaced by sign inversions and data shift operations. Furthermore, simulations and experiments have shown that the low number of weights results in a high accuracy of the blind detection at the receiver while providing good PAPR reduction performance at the receiver. Specifically, it has been found that these weight sets provide particularly advantageous performance for IEEE 802.11™ systems.

In some embodiments the set of weights may comprise a weight common to a plurality of pilot symbols of the OFDM symbol. In particular, the weight generator 109 may determine only a single weight which is applied to all the pilot symbols in an OFDM word. This may provide a number of advantages including substantially simplifying the operation of the evaluation of the PAPR for all possible weight combinations. It may furthermore provide improved performance and increased blind detection accuracy as all pilot symbols may be considered for just one weight.

In some embodiments, the OFDM symbol generated by the PAPR of the OFDM symbol generator 103 may be determined before any weight evaluations are carried out. The process of determining weights for PAPR reduction may then be made conditional on the determined PAPR and may in particular only be performed if the PAPR of the original symbol is acceptable. For example, the OFDM transmitter 100 (and in particular the linear power amplifier 117) may be designed to comply with a given dynamic range. Accordingly, all OFDM words having a time domain dynamic range below this dynamic range can be processed without any PAPR reduction whereas PAPR reduction as described above may be applied to all OFDM words having a larger dynamic range than the transmit path is designed for.

Figure 3:
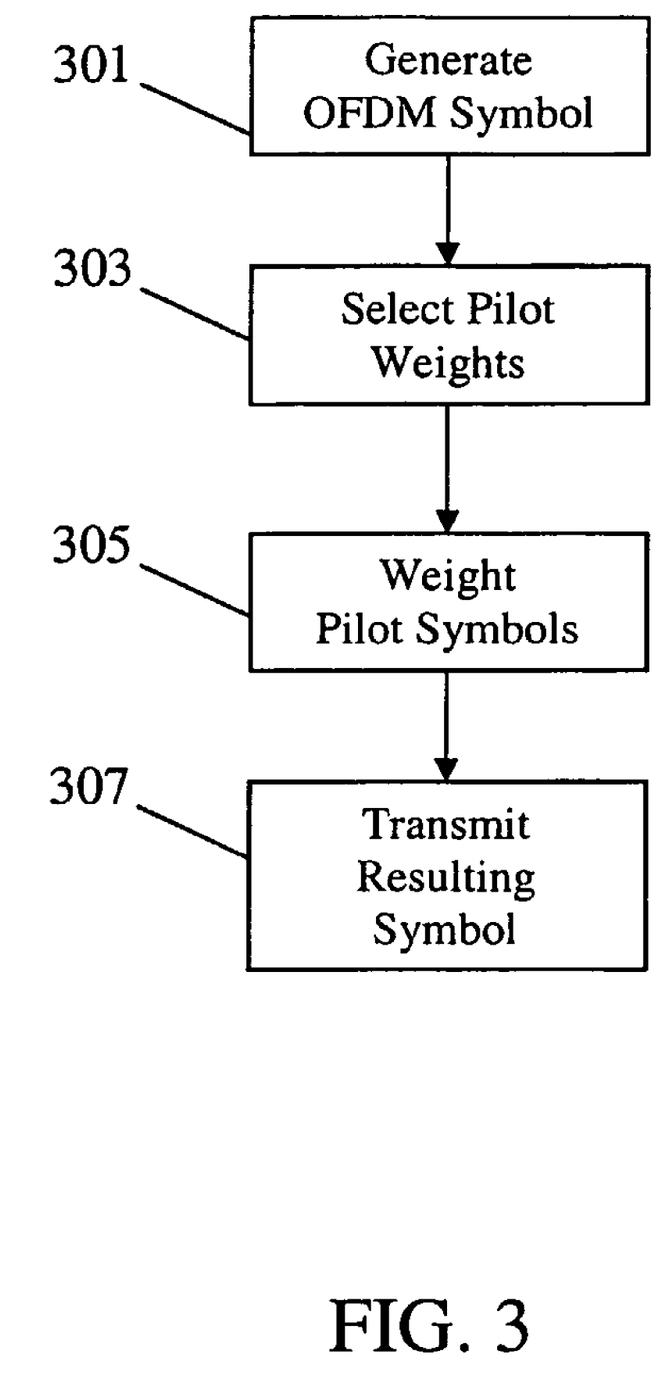
FIG. 3 illustrates a method of transmitting data in a communication system in according with some embodiments of the invention.

FIG. 3 illustrates a method of transmitting data in a communication system in accordance with some embodiments of the invention. The method may for example be suitable for the transmitter of FIG. 1.

In step 301 a first OFDM symbol comprising user data and pilot data is generated where the pilot data comprises a set of predetermined non-orthogonal pilot symbols.

Step 301 is followed by step 303 wherein a set of weights is selected for the pilot data of the first OFDM symbol in response to a time domain amplitude variation characteristic for the first OFDM symbol. The set of weights are selected from a discrete alphabet of weights.

Step 303 is followed by step 305 wherein a second OFDM symbol is generated by weighting the pilot symbols by the set of weights.

Step 305 is followed by step 307 wherein the second OFDM symbol is transmitted to a receiver without transmitting identification of the selected set of weights.

It will be appreciated that although the above description has focussed on a single antenna system, the invention is equally applicable to for example Multiple In Multiple Out (MIMO) systems such as considered for IEEE 802.11n™ systems.

Specifically, in order to improve efficiency and to achieve the high data rates, IEEE 801.11n™ is planned to introduce a number of advanced techniques. For example, IEEE 801.11n™ communication is expected to typically be based on a plurality of transmit and receive antennas. Furthermore, rather than merely providing diversity from spatially separated transmit antennas, IEEE 801.11n™ will utilise transmitters having at least partially separate transmit circuitry for each antenna thus allowing different sub-signals to be transmitted from each of the antennas. The receivers may receive signals from a plurality of receive antennas and may perform a joint detection taking into account the number and individual characteristics associated with each of the plurality of transmit antennas and receive antennas. Specifically, IEEE 801.11n™ has seen the likely introduction of a Multiple-Transmit-Multiple-Receive (MTMR) antenna concept which exploits Multiple-Input-Multiple-Output (MIMO) channel properties to improve performance and throughput.

The OFDM transmitter may in particular comprise means for Space Time Coding (STBC) or Spatial Division Multiplexing (SDM) of OFDM symbols transmitted on a plurality of antennas.

In the case of STBC, the same symbol is typically re-transmitted several times applying a factor of (−1) and/or a complex conjugation (in the time or frequency domain). However, neither of these operations affect the PAPR characteristics of the basic OFDM symbol. Thus, for a plurality of transmit antennas, a different OFDM symbol is fed to each antenna (as defined by the STBC) which is PAPR optimized.

Specifically, in the context of STBC the same coding scheme may be applied to the pilot data as is applied to the user data. E.g. in a typical case of an Alamouti STBC, conjugate/sign-inversion operations are applied to both pilot data and user data.

With Alamouti like STBC schemes, the replications of the symbols should allow separate weighting factors on each pilot tone and a larger weighting factor alphabet.

For SDM schemes, the choice will fall more likely on a common weighting factor for all pilot tones of a given OFDM symbol and on a small alphabet.

Figure 4:
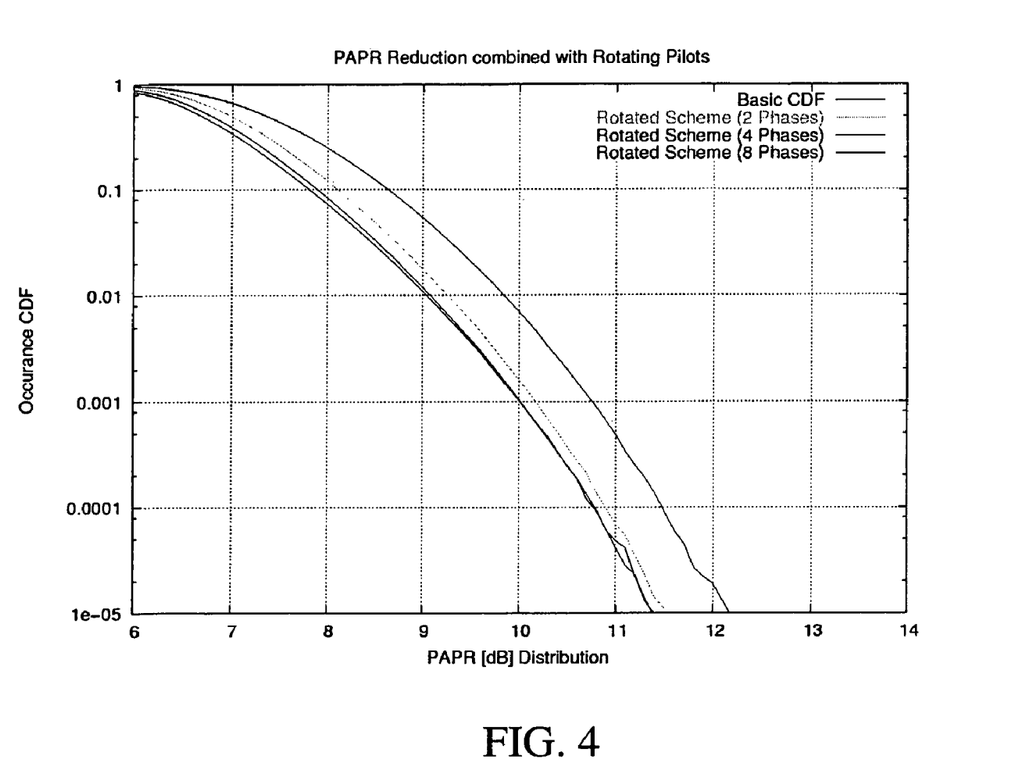
FIG. 4 illustrates an example of a peak to average power ratio reduction for some embodiments of the invention.

An example of the performance improvement that can be provided by the described approaches is shown in FIG. 4. The results are obtained by simulation of an IEEE 802.11™ system by determining the PAPR cumulative density function for the case without weighting factor and for using weight sets with respectively 2, 4 and 8 weights.

As illustrated, in a typical example a PAPR gain of approx. 0.8 dB is achieved for PAPR values of approx. >8 dB. This reduction may result in approx. 20% reduction of the power consumption reduction of the linear power amplifier.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It will be appreciated that the reference to a first and second OFDM symbol may be considered as a reference to the same OFDM symbol and that e.g. the reference to the first OFDM symbol may be a reference to the original OFDM symbol weighted by the weights for the pilot symbols.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A communication apparatus for a communication system, the communication apparatus including an Orthogonal Frequency Division Multiplex, OFDM, transmitter for transmitting OFDM symbols comprising:
   means for generating a first OFDM symbol comprising user data and pilot data; the pilot data comprising a set of predetermined non-orthogonal pilot symbols;
   means for selecting a set of weights for the pilot data of the first OFDM symbol in response to a time domain amplitude variation characteristic of the first OFDM symbol, the set of weights being selected from a discrete alphabet of weights;
   means for generating a second OFDM symbol by weighting the pilot symbols by the set of weights; and
   means for transmitting the second OFDM symbol to a receiver without transmitting identification of the selected set of weights;
   wherein the means for transmitting is arranged to transmit the second OFDM symbol on a first antenna and the transmitter further comprises:
   means for generating a third OFDM symbol by phase rotation of the second OFDM symbol; and
   means for transmitting the third OFDM symbol to the receiver on a second antenna without transmitting identification of the selected set of weights.

2. A communication apparatus as claimed in claim 1 wherein the OFDM transmitter comprises means for Space Time Coding OFDM symbols transmitted on the first and second antennas.

3. A communication apparatus as claimed in claim 1 wherein the OFDM transmitter comprises means for Spatial Division Multiplexing of the OFDM symbols transmitted on the first and second antennas.

* * * * *

UNITED STATES PATENT AND TRADEMARK OFFICE
CERTIFICATE OF CORRECTION

| | | |
|---|---|---|
| PATENT NO. | : 7,751,307 B2 | Page 1 of 1 |
| APPLICATION NO. | : 11/721574 | |
| DATED | : July 6, 2010 | |
| INVENTOR(S) | : Muck et al. | |

It is certified that error appears in the above-identified patent and that said Letters Patent is hereby corrected as shown below:

Title Page, Item (75), under "Inventors" in Column 1, Line 1, delete "Pris" and insert -- Paris --, therefor.

Title Page, Item (56), under "OTHER PUBLICATIONS" in Column 2, Line 3, delete "Vehiclular" and insert -- Vehicular --, therefor.

Title Page, Item (56), under "OTHER PUBLICATIONS" in Column 2, Line 4, delete "Vehiclular" and insert -- Vehicular --, therefor.

Title Page, Item (57), under "ABSTRACT" in Column 2, Line 4, after "pilot" delete "data where the" and insert -- data. The --, therefor.

Title Page, Item (57), under "ABSTRACT" in Column 2, Line 7, after "data" delete "of the first OFDM symbol".

Title Page, Item (57), under "ABSTRACT" in Column 2, Line 9, after "symbol." delete "In particular, the" and insert -- The --, therefor.

Title Page 2, Item (56), under "OTHER PUBLICATIONS" in Column 1, Line 3, delete "Vehiclular" and insert -- Vehicular --, therefor.

Title Page 2, Item (56), under "OTHER PUBLICATIONS" in Column 1, Line 4, delete "Vehiclular" and insert -- Vehicular --, therefor.

Title Page 2, Item (56), under "OTHER PUBLICATIONS" in Column 2, Line 13, delete "Autria," and insert -- Austria, --, therefor.

In Column 3, Lines 63-64, delete "values" and insert -- values. --, therefor.

Signed and Sealed this
Sixth Day of November, 2012

David J. Kappos
*Director of the United States Patent and Trademark Office*